(12) United States Patent
Slember et al.

(10) Patent No.: US 11,468,087 B1
(45) Date of Patent: Oct. 11, 2022

(54) SYSTEM AND METHOD FOR BI-DIRECTIONAL REPLICATION OF DATA OBJECTS IN A HETEROGENEOUS STORAGE ENVIRONMENT

(71) Applicant: DBM Cloud Systems, Burlingame, CA (US)

(72) Inventors: Joseph Slember, Burlingame, CA (US); Kyle Fortin, Burlingame, CA (US)

(73) Assignee: Nasuni Corporation, Boston, MA (US)

( * ) Notice: Subject to any disclaimer, the term of this patent is extended or adjusted under 35 U.S.C. 154(b) by 195 days.

(21) Appl. No.: 16/394,787

(22) Filed: Apr. 25, 2019

Related U.S. Application Data

(60) Provisional application No. 62/663,738, filed on Apr. 27, 2018.

(51) Int. Cl.
| | |
|---|---|
| *G06F 16/27* | (2019.01) |
| *H04L 67/1097* | (2022.01) |
| *H04L 67/1095* | (2022.01) |
| *G06F 9/54* | (2006.01) |

(52) U.S. Cl.
CPC .............. *G06F 16/27* (2019.01); *G06F 9/547* (2013.01); *H04L 67/1095* (2013.01); *H04L 67/1097* (2013.01)

(58) Field of Classification Search
CPC .. G06F 16/27; H04L 67/1095; H04L 67/1097
See application file for complete search history.

(56) References Cited

U.S. PATENT DOCUMENTS

| | | | |
|---|---|---|---|
| 9,454,441 B2* | 9/2016 | Elson | G06F 11/1662 |
| 10,917,260 B1* | 2/2021 | Bashyam | G06F 9/54 |
| 2015/0154418 A1* | 6/2015 | Redberg | G06F 21/6218 713/165 |
| 2016/0259811 A1* | 9/2016 | MacKay | H04L 67/1095 |

\* cited by examiner

*Primary Examiner* — Grace Park
(74) *Attorney, Agent, or Firm* — David H. Judson

(57) ABSTRACT

A system and method of managing object data stored in a heterogeneous cloud environment comprises a separate cloud management system disposed such that the communications path between a user and each cloud to which the user has access is a different communications path than that between the user and the cloud management system or the cloud management system and each of the clouds.

1 Claim, 9 Drawing Sheets

Information and Control Flow

Fullsail_IMG_1006.JPG
Blob

🖫Save ✕Discard ⟳Refresh ⤓Download ⊘Acquire lease ⊘Break lease 🗑Delete

┌─────────┐
│Overview │  Snapshots   Edit blob   Generate SAS
└─────────┘

Properties

| | |
|---|---|
| URL | https://dbmclouds.blob.core.wind... 📋 |
| LAST MODIFIED | 1/11/2019, 9:47:01 AM |
| CREATION TIME | 1/11/2019, 9:47:01 AM |
| TYPE | Block blob |
| SIZE | 103.73 KiB |
| SERVER ENCRYPTED | true |
| ETAG | 0x8D677D3A4D050D |
| CONTENT-MD5 | - |
| LEASE STATUS | Unlocked |
| LEASE STATE | Available |
| LEASE DURATION | - |
| COPY STATUS | - |
| COPY COMPLETION TIME | 1/11/2019, 9:47:01 AM |

[Undelete all snapshots]

Access Tier
Optimize storage costs by placing your data in the appropriate access tier. Learn more

[Hot (Inferred) ▼]

Metadata

| ☐ KEY | VALUE | |
|---|---|---|
| ☐ mytag | Pictures | 🗑 |
| ☐ dbm_lastmod | 2019-01-11 14:40:25+00:00 | 🗑 |
| ☐ dbm_etag | 0x8D677D2B9621325 | 🗑 |
| [ ] | [ ] | |

FIG. 3

Fullsail_IMG_1006.JPG Latest version ▶

| Overview | Properties | Permissions | Select from |

Storage class

Use the most appropriate storage class based on frequency of access.

Learn more

⊙ Standard

Encryption

Use encryption to protect your data while in-transit and at rest.

Learn more

⊙ AES-256

Metadata                                                ✕

+ Add Metadata    Delete    Edit ⓘ

| Key | Value |
|---|---|
| ○ Content-Type | image/jpeg |
| ○ x-amz-meta-dbm-etag | 88fa07f1224360aec902feeac5249601 |
| ○ x-amz-meta-dbm-lastmod | 2019-01-11 21:03:48.004000+00:00 |
| ○ x-amz-meta-mytag | Pictures |

Cancel  Save

FIG. 4

| Time | message |
|---|---|
| April 10th 2018, 10:30:55.101 | dbm-select - [2018-04-10T14:30:45.619+0000] INFO "[dbm-bkt1] PutReplication rev='336-aac899e6c585cdd1a708cae2e3d89963d'" |
| April 10th 2018, 10:29:56.602 | dbm-select - [2018-04-10T14:29:43.140+0000] INFO "Processing buckets in config db at startup" |
| April 10th 2018, 10:25:53.397 | dbm-replication - [2018-04-10T14:25:35.322+0000] INFO "API DeleteReplication s3://dbm-bkt1?replication" |
| April 10th 2018, 10:25:52.888 | dbm-select - [2018-04-10T14:25:35.666+0000] INFO "[dbm-bkt1] DeleteReplication rev='335-29ba482750ed1f5b79e8db6929f5eacb'" |
| April 10th 2018, 10:22:05.843 | dbm-select - [2018-04-10T14:21:50.107+0000] INFO "[dbm-bkt1] Filter resumed" |
| April 10th 2018, 10:21:52.655 | dbm-select - [2018-04-10T14:21:46.103+0000] INFO "[dbm-bkt1] PutReplication rev='334-2d6330a43a482b239b61619644adbf72'" |
| April 10th 2018, 10:03:29.937 | dbm-select - [2018-04-10T14:03:06.744+0000] INFO "[dbm-bkt1] verifying head on dst bucket: dbm-bkt2" |
| April 10th 2018, 10:03:29.098 | dbm-select - [2018-04-10T14:03:06.695+0000] INFO "[dbm-bkt1] verifying head on src bucket: dbm-bkt1" |
| April 10th 2018, 10:03:22.897 | dbm-select - [2018-04-10T14:03:06.975+0000] INFO "[dbm-bkt1] worker threads started" |
| April 10th 2018, 10:03:20.415 | dbm-select - [2018-04-10T14:03:06.364+0000] INFO "[dbm-bkt1] Started, destination = dbm-bkt2" |
| April 10th 2018, 10:00:49.650 | dbm-select - [2018-04-10T14:00:31.950+0000] INFO "[dbm-bkt1] Initial scan starts" |
| April 10th 2018, 10:00:48.769 | dbm-select - [2018-04-10T14:00:33.332+0000] INFO "[dbm-bkt1] Filter paused" |
| April 10th 2018, 10:00:48.748 | dbm-select - [2018-04-10T14:00:30.977+0000] DEBUG "[dbm-bkt1] pre[000]:IBM, status:Enabled" |
| April 10th 2018, 10:00:48.702 | dbm-select - [2018-04-10T14:00:31.688+0000] DEBUG "[dbm-bkt1] Queues: regular=1800 big=200" |
| April 10th 2018, 10:00:48.582 | dbm-select - [2018-04-10T14:00:31.035+0000] DEBUG "[dbm-bkt1] counters: [0, 0, 0, 0, 0, 0, 0, 0, 0, 0, 0, 0, 0, 0, 0]" |
| April 10th 2018, 10:00:48.578 | dbm-select - [2018-04-10T14:00:31.688+0000] DEBUG "[dbm-bkt1] workers: regular=900 big=100" |
| April 10th 2018, 10:00:48.000 | dbm-select - [2018-04-10T14:00:31.021+0000] DEBUG "[dbm-bkt1] Databases: ['dbm_replication', 'dbm_replication_status']" |
| April 10th 2018, 10:00:47.975 | dbm-select - [2018-04-10T14:00:30.978+0000] INFO "[dbm-bkt1] Started, destination = dbm-bkt2" |
| April 10th 2018, 10:00:47.950 | dbm-select - [2018-04-10T14:00:30.977+0000] DEBUG "[dbm-bkt1] pre[001]:strut, status:Enabled" |
| April 10th 2018, 10:00:47.490 | dbm-select - [2018-04-10T14:00:31.448+0000] INFO "[dbm-bkt1] Verifying head on dst bucket: dbm-bkt2" |
| April 10th 2018, 10:00:47.218 | Container became healthy |
| April 10th 2018, 10:00:46.868 | dbm-select - [2018-04-10T14:00:30.447+0000] INFO "Done processing buckets at startup, monitoring changes now" |
| April 10th 2018, 10:00:46.854 | dbm-select - [2018-04-10T14:00:30.446+0000] INFO "[dbm-bkt1] Starting replication" |
| April 10th 2018, 10:00:46.830 | dbm-select - [2018-04-10T14:00:31.145+0000] INFO "[dbm-bkt1] Verifying head on src bucket: dbm-bkt1" |
| April 10th 2018, 10:00:46.239 | dbm-select - [2018-04-10T14:00:30.425+0000] INFO "Processing buckets in config db at startup" |
| April 10th 2018, 10:00:45.471 | dbm-select - [2018-04-10T14:00:30.447+0000] INFO "[dbm-bkt1] PutReplication to dbm-bkt2" |
| April 10th 2018, 10:00:45.137 | dbm-select - [2018-04-10T14:00:30.391+0000] DEBUG "Databases: ['dbm_replication', 'dbm_replication_status']" |
| April 10th 2018, 10:00:36.267 | Starting health monitoring of container |
| April 10th 2018, 10:00:35.474 | Successfully created container |

FIG. 9

SYSTEM AND METHOD FOR BI-DIRECTIONAL REPLICATION OF DATA OBJECTS IN A HETEROGENEOUS STORAGE ENVIRONMENT

The present application claims the benefit of U.S. provisional application Ser. No. 62/663,738, filed on Apr. 27, 2018, which is incorporated herein by reference.

BACKGROUND

Using the Internet or dedicated high-bandwidth data communication services as a transport mechanism, various types of data storage and data processing applications have been developed by providers to transfer the performance of modern information processing and storage tasks from a local user or local data center to another location or provider, in whole or in part. One approach to doing this is to store the data, whether it is image data, emails, accounting records, text documents or the like in a location now generally referred to as "the cloud". The service might be termed a remote data center, which may be a plurality of locations appearing to be a single location, or multiple locations or by some other name. Some of the functions performed in the cloud employ already standardized protocols such as HTML and REST, but the detailed requirements of each provider may differ as to the functions performed, authentication methods and the like.

The diverse detailed requirements for the multiple service providers, and the specific scope of the services provided by each, can limit the ability of a user to select appropriate resources to service a specific use case, or to change the details of such a use case.

Replication of data is a technique that may be used to provide protection against data loss, to permit geographically disparate locations to efficiently store or access data, to provide data examples for development of new services and techniques, or the like. Where data is being stored as an object in a storage location (which may appear to the user as a web address) the ability to manage the replication of objects may be constrained.

In an example, Amazon Web Services (AWS) divides its storage environment into regions, where each region comprises one or more data storage facilities, providing the capability to store data, process data, supply data to users, which may be the public or private, as a function accessible using the Internet. While a user may specify a service with a stated reliability and availability, and such services may achieve this performance, the short-term characteristics of a service outage, while short compared with a year, may be intolerable. Furthermore these outages may not be due to the storage system provider, but may result from, for example, failures in the network of data communications systems used to link the user and the service provider. In such a case, while the data being stored in a supplier region, for example, may be protected from loss by replication (duplication) within such a region, access to the data may be impossible until the communications, configuration or other fault has been rectified.

Amazon AWS may provide a certain type of redundancy within a storage region of their global distribution of storage regions, but the maintenance of redundancy across storage regions has different protocols and characteristics including access time, cost and the like.

In another aspect, the physical storage location of data may be restricted by national regulations regarding data privacy or similar requirements. In yet another aspect, a user may desire to store a copy of the same data on two different cloud storage locations and be able to selectively use either of the instances of the same data. In some cloud services, the replication of user-encrypted data is not supported.

Object data storage differs from previous concepts of file storage or block storage, in that an object being stored is represented in a flat address space schema. A protocol developed by AWS is known as Simplified Storage Service (S3) has been adopted or adapted by many providers of web-based (or cloud) storage. Other service providers may have similar interface protocols with more or fewer functional characteristics.

A user may establish an account with a provider (including, but not limited to AWS) having a S3-compatible or similar protocol and create named storage areas known as "buckets". Such buckets may have globally unique names, but the term "global" in this context may only pertain to a specific provider such as Amazon. In some storage clouds the bucket name may only be required to be unique in a specific data center.

Buckets may store a plurality of objects where an "object" is a named instance of an unstructured data element of data bits which may be of a variable size in each instance or version. Data contained within the object may be image data, data base information, or groups of files, as non-limiting examples. While there may be an upper limit of the size of the object, this is often a result of practical considerations such as the time to upload the object, and this size may be expressed as a limit for a data center, but the number of objects that can be stored in a specific named bucket is conceptually unlimited in capacity.

Each storage provider offers a different ecosystem of capabilities and transferring data between storage providers is awkward. Even the transferring of objects within a storage provider environment may be limited in function. The dispersion of data storage locations to meet accessibility, reliability, availability and data security requirements is problematic.

Object storage, in principle, establishes an extraordinarily large global name space that could encompass all of a user's storage requirements. But, maintaining object data on a plurality of distinct storage environments having diverse functional characteristics and differing in details of the system interface protocols limits a user's flexibility and efficiency of storing data in the cloud.

While one may consider that the cloud concept for data storage and management has been rapidly adopted worldwide, apart from limited aspects (such as the de facto S3 protocol, which is not entirely standardized by the various adopters) the ability of a user to select the service provider, locality and functionality of cloud services is compromised by the differing protocols and functionalities adopted by the service providers. This has arisen due to the ad hoc nature of the evolution of the cloud, a commercial incentive both to attract users with specifically tailored services and features and the desire to retain users by limiting the interoperability with competing service providers. These issues compromise the underlying flexibility, capability and usefulness of the cloud.

SUMMARY

A system and method for managing objects in a heterogeneous cloud environment is disclosed, the system comprising a server processor that receives a rule for managing an object in a replication group of objects stored in a bucket in a first cloud environment of a plurality of cloud environments. A data base of received rules is maintained by the server processor in a memory; and a data base of metadata maintained by the server processor of objects stored by the user in at least a first and a second cloud is maintained.

Responsive to receipt of a notification received from the user, that an object has been stored in the first server, including metadata for the object the server maintains the metadata data base associated with each stored object and responsive to a determination that the metadata of the object of a replication group has changed and based on the rule for the object, the system maintains the replication group of objects in accordance with the rule for the object. The system is configured such that a data path between the first cloud and the server processor is different than both the data path between the user and the first cloud and the data path between the user and the second cloud.

Where the first cloud and the second cloud have different Application Programming Interface (API)s for performing an equivalent function, the server processor formulates an API for each cloud where a function is to be performed that is compatible with the requirements of the corresponding cloud.

The server processor maintains metadata for each object stored by the user that is independent of the metadata generated by actions of the first cloud or the second cloud.

The result of the operation of the system is that a replicated copy of the object stored by the user in the first cloud is present in the second cloud, once eventual consistency is achieved and the user may read the object data from the second cloud in the event that the communications path to the first cloud or the first cloud suffers an impaired function or outage.

In an aspect, a method of managing objects stored in a heterogeneous cloud environment, comprises: maintaining in a server computer a data base of metadata for objects stored in a first cloud of a plurality of clouds; maintaining a data base of rules for objects stored in the first cloud and at least a second cloud of the plurality of clouds; updating the data base of objects and the data base of rules based on receiving from the user, a notification that an object has been stored in a bucket in the first cloud, including at least one rule for the object; determining that metadata for an object stored in the bucket of the first cloud has changed; applying the rule for the object by a sending command to at least the cloud where the object is stored; wherein the communications path between the user and the first cloud, the communications path between the user and the second cloud from the communications path between the server computer and the first cloud and the communications path between the server computer and the second cloud.

In another aspect, a method of storing object data in a heterogeneous cloud comprises; sending a new or changed object to be stored in a first cloud to a bucket in the first cloud; sending a rule for managing the object to a server processor that maintains a data base of rules and object identifications, the server processor applying the rule for the object when metadata associated with the stored object changes, or a new object identified, the application of the rule being performed independently of the user action; and, when a read request for a stored object fails, re-trying the read request if the rule for the object included storing a copy of the object in a bucket of a second cloud, wherein the re-try read request is sent to the second cloud and, a data path of the read request to the second cloud is different from a data path between the server processor and the second cloud.

In yet another aspect, a computer program product, comprises: computer-readable instructions stored on a non-transient non-volatile storage medium for configuring a server processor for: receiving a rule for managing an object in a replication group of objects stored by a user in a bucket in a first cloud environment of a plurality of cloud environments; maintaining a data base of rules in a server processor memory for managing a replication process from a first cloud to a second cloud; maintaining a data base of user metadata of objects stored by the user in at least a first cloud of the cloud environment; receiving a notification from the user, that an object has been stored in the first server, including metadata for the object and the rule for the object, and maintaining the data base of rules and the data base of metadata; responsive to a determination that the metadata of the object of the replication group has changed and based on the rule for the object, maintain the replication group of objects, wherein a data path between the first cloud and the server processor is different than both the data path between the user and the first cloud and the data path between the user and the second.

BRIEF DESCRIPTION OF THE DRAWINGS

FIG. 3 is an example of a screen shot of a GUI showing the properties of an example data object as would exist for a Microsoft Azure cloud storage instance;

FIG. 4 is an example of a screen shot of a GUI showing the properties of the example data object of FIG. 3 as would exist for an Amazon AWS S3 cloud storage instance;

FIG. 9 is an example of a transaction log maintained at the CRS.

DESCRIPTION

Figure 1:
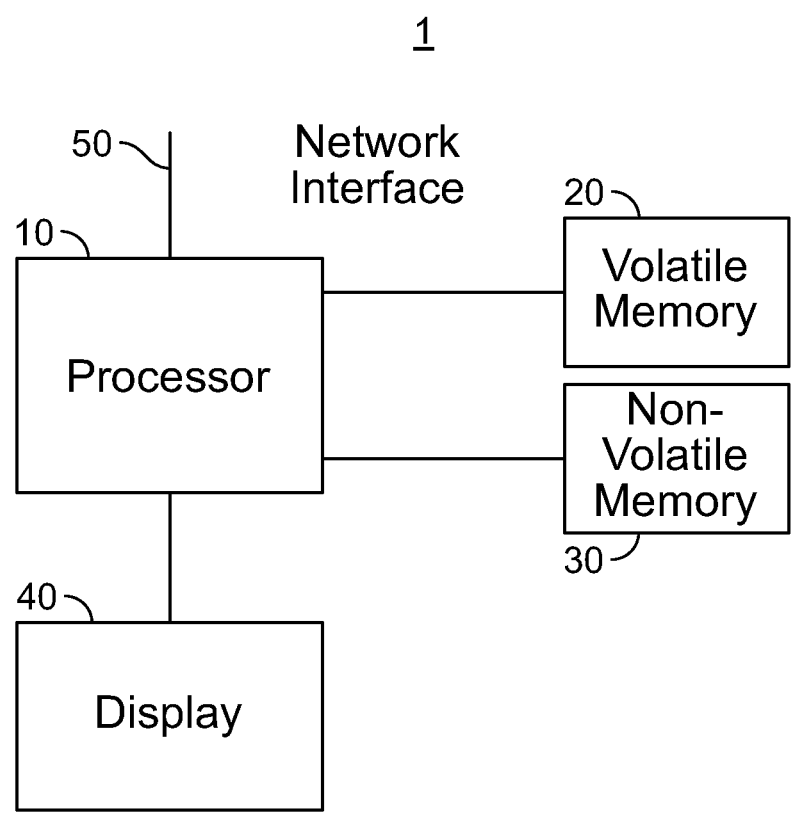
FIG. 1 is an example block diagram of a server processor capable of hosting the CRS.

The system and method disclosed herein overcomes a number of underlying structural and procedural issues that limit the efficiency, the effectivity and the economic benefits that could be available using a globally distributed storage and data processing environment, generically termed the "cloud". The ability of a user to effectively and economically manage the storage of data, the processing of data to achieve business or social objectives and the effective utilization of specialized resources is improved by providing an architectural schema that makes use of the object storage concept, bridging the diverse supplier base of the evolving "cloud".

By treating each service provider as a comparable but not entirely fungible resource, the user may, in principle, ingest data through one portal, retrieve data through another portal, process or use the data on another selected portal, as examples. Apparently comparable service providers may not provide equal service when considered in detail as there may be differing costs, communications bandwidth and ancillary services, such as, data base management, data mining or other applications programs. Storage of data on or use of a particular location of a specific service provider may be, for example, precluded or mandated by national restrictions on the location of stored data, or by user preferences that may be expressed as desiderata such as reliability, availability, response time, or the like.

The architecture described herein provides the framework for a user-oriented cloud data-replication-management system where a user-oriented computer program product executing either on a cloud service provider, a separate data center, or a user facility mediates between the user requirements and the diverse services and features provided by existing and future sources of cloud services. Necessarily, aspects of the management system will evolve with the future development of the cloud, including the Internet, virtual private networks (VPN) and other communications means, and the grammar, languages and protocols that represent evolution of the art.

Exemplary embodiments may be better understood with reference to the drawings, but these embodiments are not intended to be of a limiting nature. Like numbered elements in the same or different drawings perform equivalent functions.

It will be appreciated that the methods described and the apparatus shown in the figures may be configured by, or embodied in machine-executable instructions, e.g. software, or in firmware, or in a combination of both. The machine-executable instructions can be used to cause a general-purpose computer, a special-purpose processor, such as a DSP, array processor, or the like, that acts on the computer-executable instructions to perform functions and actions described herein; that is, to act as a particular machine. Where a single instance of any component is described, a person of skill in the art would appreciate the circumstances where a plurality of the same or similar components may be employed.

Alternatively, the operations might be performed by specific hardware components that may have hardwired logic or firmware instructions for performing the operations described, or by any combination of programmed computer components and custom hardware components, which may include analog circuits. Such components may include Application Specific Integrated Circuits (ASIC), Field Programmable Gate Arrays (FPGA), or the like which may exist or are being developed and have the capability of configurable or predetermined logic.

The methods or configurations may be provided, at least in part, as a computer program product that may include a non-volatile (non-transient) computer-readable medium having stored thereon instructions which may be used to program (configure) a computer (or other electronic devices) to perform the methods or functions. For the purposes of this specification, the terms "machine (or computer)-readable non-transient medium" shall be taken to include any tangible medium that is capable of storing or encoding a sequence of instructions or data for execution by a computing machine or special-purpose hardware and that may cause the machine or special purpose hardware to be operable to perform the methodologies or functions of the system and method described herein. The term "machine-readable medium" shall accordingly be taken to include, but not be limited to, solid-state memories, optical and magnetic disks, magnetic memories, and optical memories, as well as any equivalent device that may be developed for such purpose.

For example, but not by way of limitation, a machine readable data storage medium may include read-only memory (ROM); random access memory (RAM) of all types (e.g., S-RAM, D-RAM. P-RAM); programmable read only memory (PROM); electronically alterable read only memory (EPROM); magnetic random access memory; magnetic disk storage media; flash memory, which may be NAND or NOR configured; memory resistors; or electrical, optical, acoustical data storage medium, or the like. A volatile memory device such as DRAM may be used to store the computer program product provided that the volatile memory device is part of a system having a power supply, and the power supply or a battery provides power to the circuit for the time period during which the computer program product is stored on the volatile memory device.

For purposes of claim interpretation, the memory for storing a computer program product is "non-transient," where such a definition is given the broadest interpretation in terms of applicable memory types and techniques consistent with governing case law. Functions that are performed by a computer operable to process and execute the code may be equivalently performed by an electronic circuit. Where data is being stored, the term "non-volatile" memory may refer to any memory type where the data may be stored without loss when power is removed, including memory types where data is stored in another memory type in the event of power loss, using a back-up battery, supercapacitor, or other sufficient source of stored energy for that purpose. For avoidance of doubt, flash memory and hard disk drives are non-limiting examples of non-transient machine-readable memory.

Furthermore, it is common in the art to speak of software, in one form or another (e.g., program, procedure, process, application, module, algorithm or logic), as taking an action or causing a result. Such expressions are merely a convenient way of saying that execution of the instructions of the software by a computer or equivalent device causes the processor of the computer or the equivalent device to perform an action or to produce a result, as is well known by persons skilled in the art.

The telecommunications environment may the Internet, a local area network (LAN) a wide area network (WAN), or some combination of the architectures, typically using industry standard protocols such as TCP/P, HTML and the like over wire (physical, including fiber optic) or wireless links and serve to connect data processing and storage facilities that may be co-located or dispersed over wide geographical and political regions. Many users of the Internet do not own the facilities and make use of service providers on a subscription or fee-for-use basis of some sort, so the transport of information, commands and status information is presumed to occur as a purchased function under the control of the user for the specified purpose. Private communications networks, and virtual private networks (VPN) may be used for some or all of the communications channels. Herein, the selection of a particular communications channel for transfer of information between entities connected at the access points thereof should not be interpreted as a limitation on the subject matter disclosed or claimed, but rather to aid in understanding the system and method disclosed herein. Industry standard protocols are by their nature an evolving set of agreed requirements regulating the interoperability of devices, systems and methods of various manufacturers and further development of such standards is an expected evolution. At times, there may be communications protocols that are not widely accepted, but are in the course of experimentation and evaluation and provided that the communications protocols, networks and hardware provide for suitable communications between the entities.

A communications channel may be considered as comprising a first end point and a second end point, and each end point may be characterized, for example, by a Uniform Resource Locator (URL) which may be a unique address on the Internet, or on another such communications channel. While information transfer on the Internet involves the intermixing of data packets from a wide variety of users, each user has a separately processed communications channel as defined by the endpoints.

When describing a particular example, the example may include a particular feature, structure, or characteristic, but every example may not necessarily include the particular feature, structure or characteristic. This should not be taken as a suggestion or implication that the features, structure or characteristics of two or more examples should not or could not be combined, except when such a combination is explicitly excluded. When a particular feature, structure, or characteristic is described in connection with an example, a person skilled in the art may give effect to such feature, structure or characteristic in connection with other examples, whether or not explicitly described.

A cloud Replication System (CRS) and method comprises a functional processing and storage facility, accessible electronically by a user over a communication channel, including a computer program product, server, and an optional gateway, which may be local to the user or via the Internet or other communications capability. Data objects may be stored by the user in "buckets" (as will be described herein) at a local cloud-type facility, at one or more remotely-located or co-located cloud service providers or data centers capable of sending information which may be, for example, object data, metadata or commands by one or more communications channels. Access to a bucket and to objects stored in a bucket is controlled through permissions, and the bucket and object permissions may be independent of each other, although permissions are normally hierarchical. A user that is an "owner" of a bucket account may have the broadest permissions and may grant all or some types of permissions to other users, which may be other owners, accounts, groups or individuals. The access permissions are validated by specific access credentials that are made known to the grantee and are incorporated in those functions where access is controlled.

Herein, we shall presume that each actor, which may be a user, or other entity, including a cloud service provider, in communication with one or more of the CRS, or cloud service providers performing a specific function (such as a GET or a PUT) has been granted the appropriate access permission for the function and that improper access is, as a minimum response, refused. The user may choose to encrypt the data object prior to transmission outside the user-controlled environment in addition to utilizing SSL or other in-transit encryption. The data may already have been encrypted at rest by the user. Since the data of an object is treated as being unstructured, the actual information contents of an object are not relevant to the data storage and replication activities. This may permit backup copies of previously encrypted data to be stored in insecure data centers or locations.

Further, herein, "user" may include the account owner, or an entity entitled (for example by having credentials or permission) to control access to the bucket or the objects stored therein, including software directed by the user to access and modify the contents, storage location, or status of an object, or the like. The term "object" is generally understood by persons of skill in the art; a term such as "blob" (Binary Large Object) represents essentially the same functionality. For simplicity we typically use the term object.

As discussed in more detail below, the distributed nature of the cloud storage environment, the plurality of service providers with somewhat differing capabilities and protocols, and the inherent latencies in the transmission of large data objects over the Internet, or other communications channels and subsequent processing queues makes the management of a distributed object storage environment a complex problem. Where a user wishes to maintain replicated copies of an object in a plurality of locations for purposes such as redundancy, geographical location or the like, without detailed attention to the objects, the facilities to do so are not conveniently available.

In an aspect, these limitations may often be considered to arise from the diverse protocols used by the cloud service providers, the concept of eventual consistency versus synchronicity for cloud storage, and information bandwidth of the communication channels selected. One of the benefits of the Internet is the apparently broad choice of cloud service providers, data center services and data paths when compared with the capabilities of a local data center. An Internet-enabled cloud storage architecture is loosely organized, resilient and reconfigurable providing that some of the detailed interoperability issues can be overcome as described herein.

In an example, we consider that the user has a primary data storage and data management task that is being fulfilled by a first service provider, except perhaps for geographical location and redundancy of the already stored data. Disturbing the existing storage arrangement is fraught with the possibility of errors, data loss and the like. Thus, a purpose of this system and method is to accept the underlying storage and management schema and changes thereto and to mitigate existing deficiencies in the ability to manage replication, object-data tiering, or the like, to diverse geographical or service-provider resources. With the concepts disclosed, more effective storage schemas may be devised for new or expanded storage requirements.

Stored data objects comprise the object data itself and metadata that describes the object, as will be discussed herein. The metadata may be comprised of user metadata and service-provider-generated and maintained metadata. The object data comprises binary data of some kind, which has a size and whose composition and structure is important to the user, but not to the management system (except, perhaps partitioning to accommodate very large data objects). The metadata describes the object for management purposes and may be modified as the lifetime of the object results in changes in storage location (including internal to the service provider) while maintaining the object intact. Object storage may be used for any data that is stored in digital form. Currently, most applications are directed to uses where unstructured bulk data is stored and managed, but this is not intended to be a limitation on the system and method disclosed herein. Object data may include video such as movies, digital images, music, web pages or the like, but tables and structured data and files may also be stored. A common use of object storage is the bulk replication of data of any kind for backup, archive, disaster recovery or other purposes.

The CRS needs to observe the rules (protocols) particular to each storage provider for accessing the storage endpoint, where each endpoint may be associated with a Universal Resource Identifier (URI) that maps to a storage meme termed a "bucket" which is "owned" by the user, for example, by having incurred a maintenance fee or the like, imposed by the storage provider for initial storage of the object and when manipulating objects stored in the bucket. The user is responsible for configuring the access permissions of the bucket, including any encryption, in accordance with the specific protocol of the service provider.

Each object, of whatever size is needed by the data to be stored, may be described by extensive use-supplied metadata accompanying the object, but external to the object itself. The metadata may be read and modified independently of the associated object, whereas the contents of the object are immutable once it has been created. The metadata is usually contained in the header portion of the object of each bucket, but copies of the metadata or a part thereof may be stored elsewhere. Updating the data of an object requires replacing the object. A subset or superset of metadata for each object may also be maintained by the CRS.

Several types of metadata may be associated with an object stored in a bucket on a cloud service provider. Some of this metadata may be structured by the service provider and some of the metadata may be created and maintained by the user. Tags may be used to identify groups of objects having special characteristics such as being restricted to storage in specific geographic regions, having security restrictions due to regulatory compliance, state of encryption, or other object properties that may be used to control access or processing of the object and may be the subject of a rule. System metadata are defined by the cloud service provider and are used by the service provider in managing the storage and retrieval of the data. Some of the system metadata fields are restricted to provider control, however other fields, although system defined, are controllable by the user. Some of the system metadata may be read and used by the CRS. Much of the control and manipulation of stored objects by the CRS is based on the user defined and controlled metadata. Since this metadata is independent of the system provider and not controlled by the system provider, the status and permissions and other attributes are maintained by the CRS and used in the operations described herein.

The CRS, may be considered as an overlay on the existing storage infrastructure defined by the user. The CRS may not store object data, nor need the objects themselves be routed through the CRS. Although the CRS is not limited to managing only object replication, the underlying concept and function are described in such terms herein for simplicity of presentation.

The CRS differs from previous cloud management systems as the control paths are not in the data path. Changes to the CRS including software updates and reboots do not affect the stored data objects. Upon resumption of operation after update or reboot, the CRS will continue from the last competed operation rather than re-copy all objects from the source bucket to the destination bucket. Only changed objects or new objects will be replicated. As the control path between the CRS and the cloud providers is separate from the user object data path and storage instructions, only access to the cloud logical endpoints or portals is needed and the actual CRS hardware, location, and the configuration of software program product, are independent of the functions of object data storage and user data access as perceived and experienced by the user. Nothing, however, prevents the location of the CRS, in whole or in part, on a cloud vendor platform or as a commercial service of a cloud vendor.

No special agent is required to be installed on production or user host systems. The CRS is configured to utilize the various Internet or cloud interfaces rather than installing special agent software on the production or user host systems, or the cloud provider to perform this function. The CRS may be considered to act in parallel with, and asynchronously with, the user and the configured cloud vendor capabilities, and outages of the CRS do not affect the user object traffic.

A CRS is configured to provide the ability to discover and track all objects in user specified buckets and, as further described herein, determine the differences between the source and target buckets and to copy objects from source buckets to destination buckets such that the object data in the source and destination buckets becomes eventually consistent. This function is independent of the specific on-premise environment, hybrid cloud, public cloud or private clouds, where the proper access credentials exist.

The CRS maintains several databases of object metadata, including the location of the stored object, and the schema for data management devised by the user for a particular subset of the objects being managed. The data base system may be selected based on the specific design requirements and may be one of a number of existing data base systems such as Cassandra; however nothing here in is intended to restrict the choice of data base system. The CRS can be located at any appropriate Internet endpoint. The CRS may be realized as a plurality of the same applications, executing on different resources and operating in synchronism, or mirrored for redundancy or throughput purposes. For simplicity we will describe the CRS as a single entity with the understanding that the CRS should be a redundant capability of some type.

A CRS may be realized in a variety of embodiments, including stand-alone computer hardware interfaced to the Internet, one or more servers supporting displays for configuring or managing the operations, or virtual machines (VM) operating on a host computer or in the cloud, as are well known in the art, that share computing, storage and other resources between multiple independent users of a facility such as a data center or a cloud interface so that each user appears to have independent and exclusive use of the resources. Such embodiments may include the a "server computer" 1, shown in FIG. 1, having the capabilities of a general purpose processor or special-purpose digital processer 10 and having access to a volatile memory 20 and a non-volatile memory 30. Further, this server computer 1 may have communications interfaces 50 such as to the Internet or other communications channel end points and to a display 40. Where a display 40 is used, the display may be an alphanumeric display or a graphical or computer video terminal depending on the capabilities needed.

In another aspect, some or all of the capabilities "server computer" may be purchased, leased or otherwise procured from third parties as, for example, a VM executing in a host computer of a third-party data center, for the execution of the computer program product described herein to perform some or all of the functions needed. In such an instance, at least an executable version of the computer program product would be uploaded to the VM and stored by the service provider for the duration of the use of such computer program product.

The "cloud" and its services are often conceptualized as some abstract space having rules of operation and capacity to store and process data. This arises as the conventional user interacts with the cloud through an Applications Programming Interface (API) or a Graphical User Interface (GUI) that insulates the conventional user from the hardware and operating system requirements. However the functions that the user executes in the cloud are actually performed by physical computing hardware located somewhere and in communication with the required assets over the Internet or other suitable communications channel. It is a modern outgrowth of a local data center.

The CRS may maintain a database of the metadata of stored objects, both those initially stored by the user and the historical descendants thereof. A database of rules for managing the stored objects may be populated with rules established by the user, which are changeable by the user. Another database may contain the access permissions (so called Access Control List (ACL)) that determine which entities may read, write, delete, copy or otherwise modify the stored object.

Figure 2:
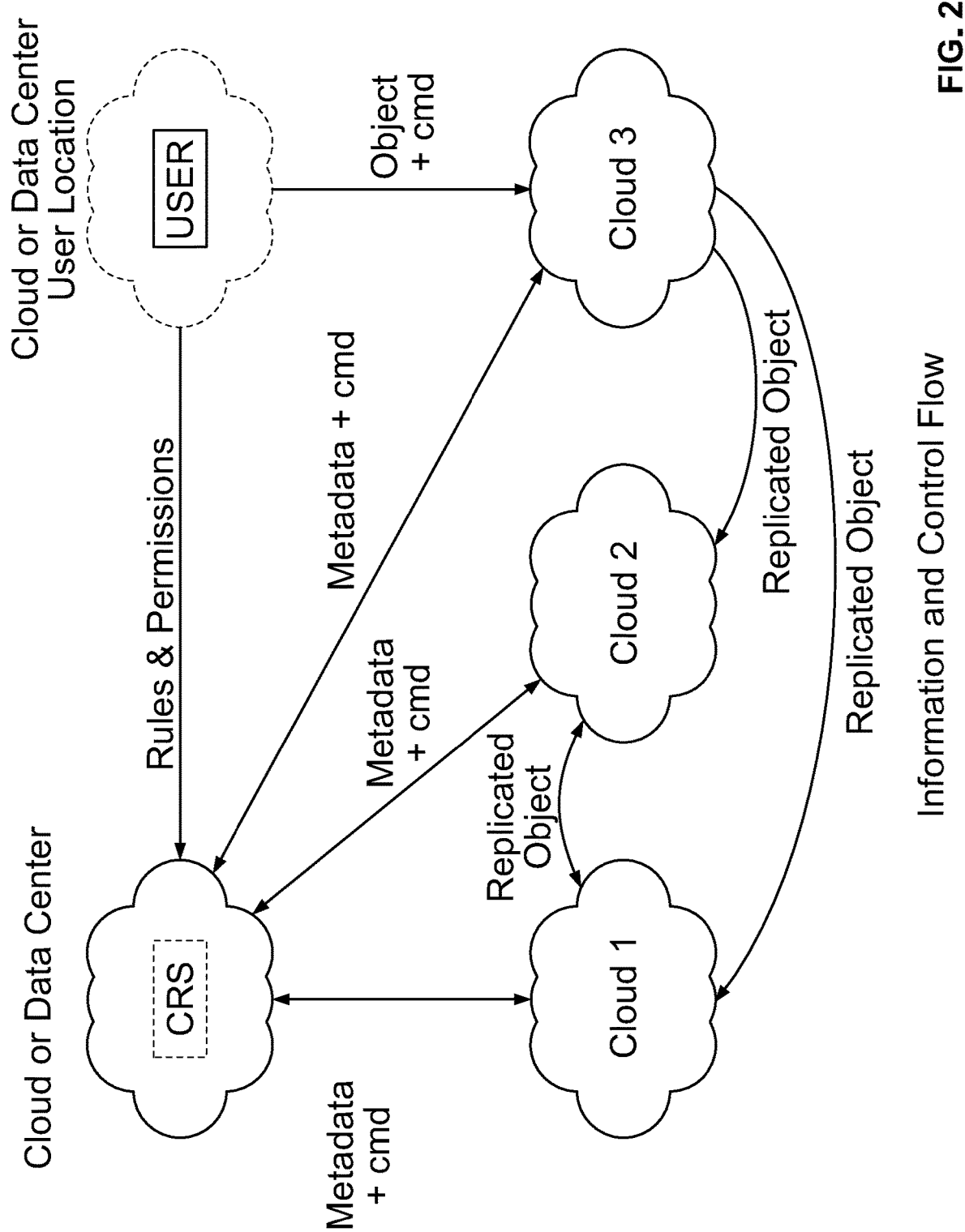
FIG. 2 is a conceptual drawing of an example of the flow of object data, metadata and commands in a heterogeneous cloud environment.
Figure 5:
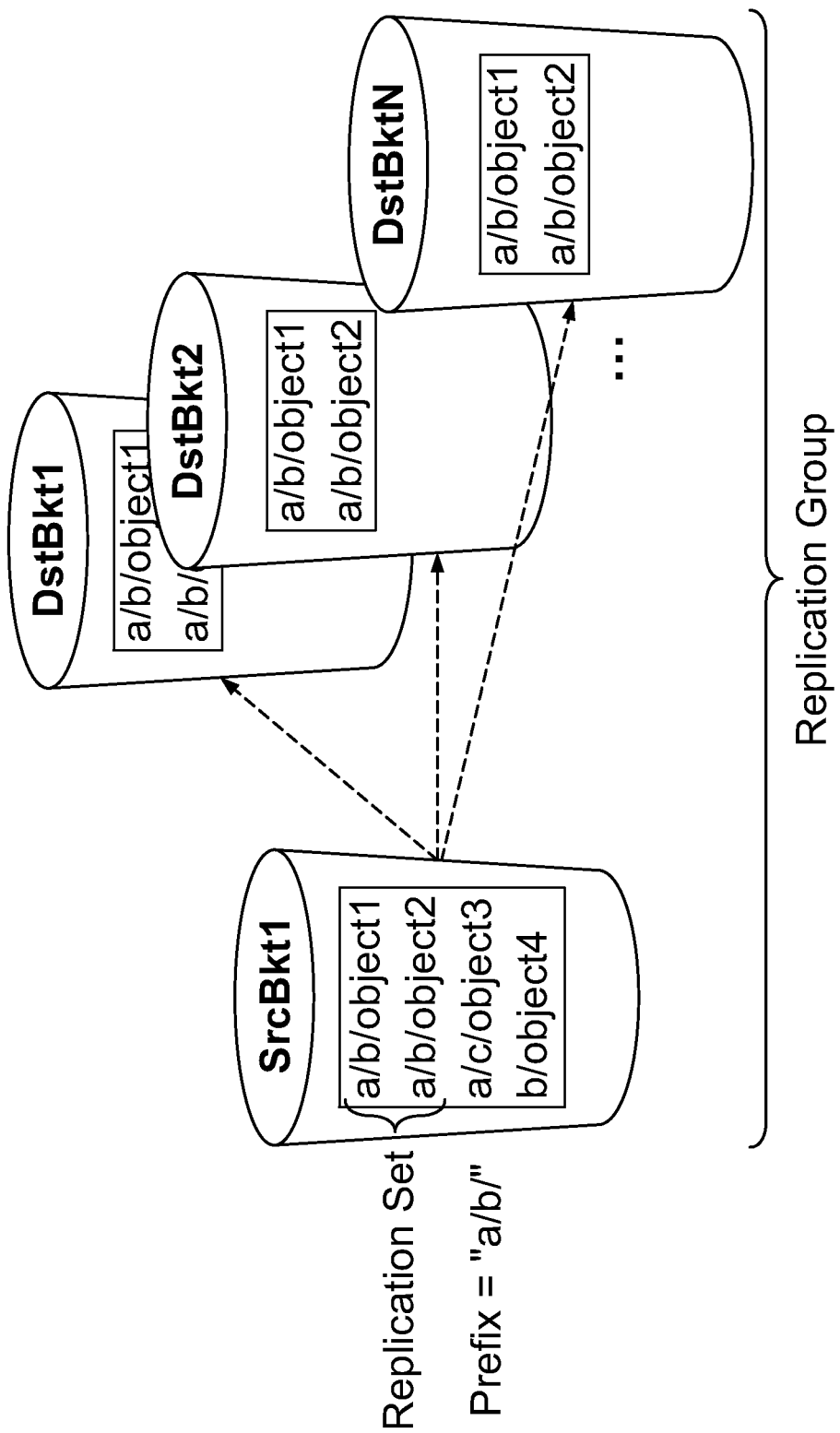
FIG. 5 is an example of associating a group of objects in a source bucket with more than one destination bucket.
Figure 6:
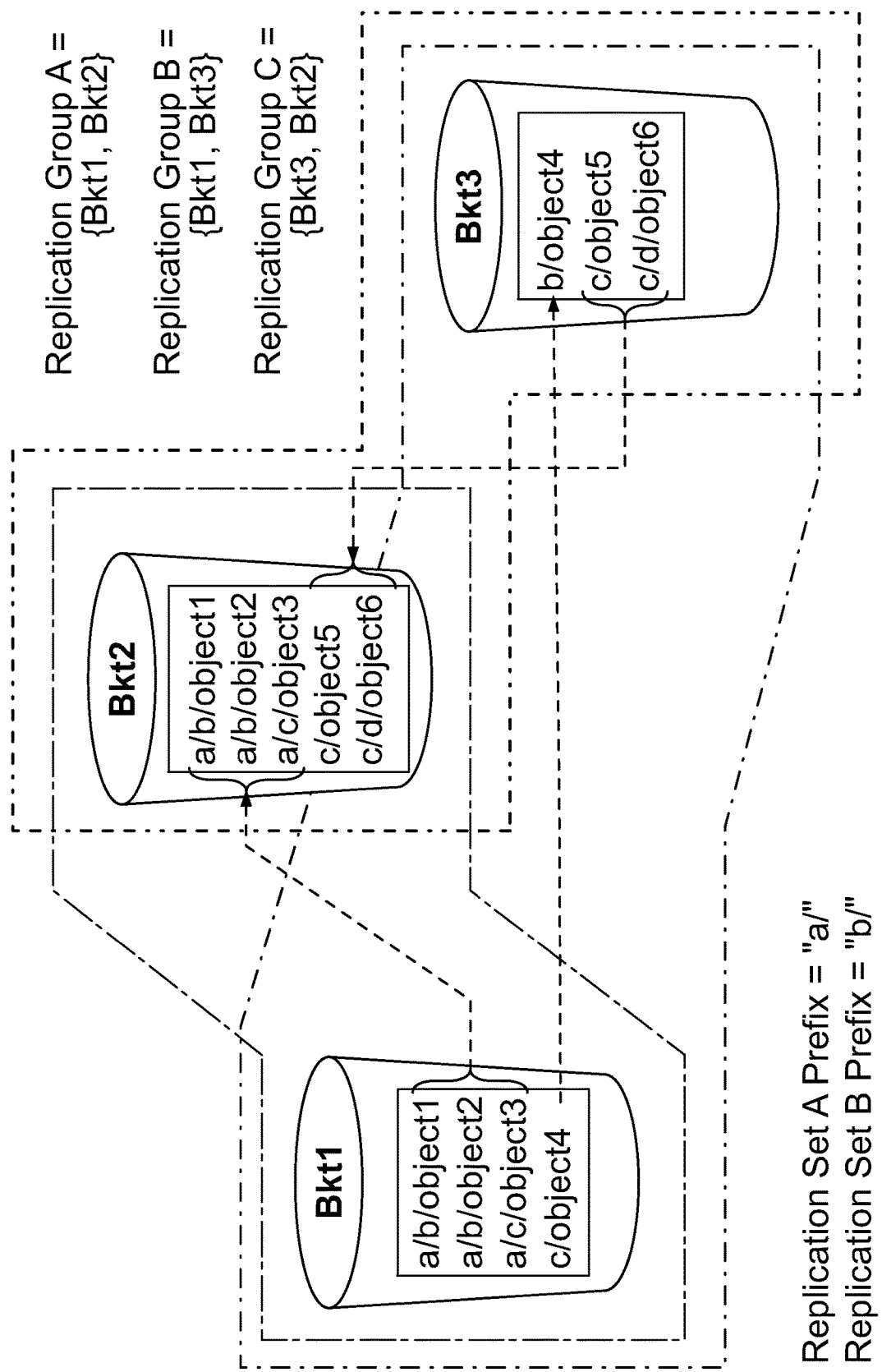
FIG. 6 is an example showing a situation where objects in a bucket may be included in different replication groups based on prefix.

The FIG. 2 is a simplified diagram of an example of a cloud storage environment comprising a User, a plurality different clouds (cloud 1, cloud 2 and cloud 3) and at least one instance of the CRS. As implied by the diagram, the CRS may exist and execute in the environment of a cloud service provider as an endpoint location, or be a data center, or the like. Similarly, the user may be a data center, a data entry terminal or an application executing in the cloud. Any of these entities may be co-located except as dictated by operational or redundancy constraints.

In this example, the user has chosen cloud 3 as the initial repository for the data object and has determined that the capability to store and retrieve the objects can also be performed by clouds 1 and 2. These cloud instances may be different regions of the same service providers or different service providers. Without loss of generality, we sometimes refer to these clouds as AWS, Azure, IBM and Google or variants thereof after the corporate identities of major vendors. This is not intended to limit the vendor that may be selected by a user.

The clouds are only partially interoperable and each cloud may provide different variations on what is a similar service, but may not necessarily include all services desired by the user. This limitation may have led the user to select from one or more appropriate service provider and services. In this example, we are concerned with the replication activity although it will be apparent to a person of skill in the art that other metadata and rule dependent services, such as data tiering, that are metadata dependent may also be efficiently provided.

The user may store an object in a bucket of cloud 3 by sending the object package (including the initial object data and metadata) and an appropriate command (e.g., PUT) to a named bucket in cloud 3 for which access permissions have been established. The cloud ingests the data. Depending upon the particular cloud service, the completion of the operation (which we will discuss as "eventual consistency") is later confirmed either by a push event notification of completion from cloud 3 (if that service is available), a subsequent read of the headers of the target bucket or similar data that establishes the presence of the object in the bucket, or by polling a queue of completed events.

When the object is initially stored, the user constructs or selects rules for replicating or otherwise managing the subsequent procedural history of the object (e.g., replication, tiering) and sends the rule and the appropriate permissions including source and destination buckets to the CRS. The rule may be formulated for a specific object or be selected from previously formulated rules.

A common current approach places the replication management function in the data path itself and can adversely impact performance and downtime. In the system and method disclosed herein, the user may access the object data directly, without using the CRS, rather than being forced to go through a replication platform itself to access the object data. The present replication management approach does not need to access, modify, handle or edit the stored data object itself, reducing the possibility of data corruption or loss and avoiding data transmission bottlenecks. Once stored, the stored data object may be replicated asynchronously using the facilities of the cloud providers, including any data paths that may be provided or utilized by the cloud providers, including interchange arrangements, or the like, based on the established rules and without intervention by the User.

Until a rule is changed the CRS undertakes to manage the subsequent history of the stored object in accordance with the rule. The rules can be established before or after objects have been stored and may be changed later. Typically, a rule may be established for a class of objects in the bucket that are characterized by a searchable aspect of the object metadata. This class of objects may be termed a "replication group".

Overcoming the limitations of the "eventual consistency" of the storage of an object in the cloud is an important aspect of process of management of replication. The correct current version of the object needs to be established at a particular time datum and be robustly maintained in the presence of changes to the stored objects. That this process takes a finite, but not constant time is a design consideration.

Each bucket may have a plurality of rules, just as each bucket may have a plurality of different objects of diverse character. A rule may be said to apply to a replication group which may be defined in terms of, for example, an object identifier prefix (which might be analogous to a directory in a file system or a folder in a GUI) and the rules may be applied to a plurality of such identified objects. The rule may invoke other aspects of the object metadata, such a size, age, tag identifications and limitations, or the like.

The rule may continue to define the actions to be taken based on the contents of the metadata. This includes a change in the status of the object. That is, rules may address the actions to be taken when an object is created, modified, or deleted.

A change in state of the object is sensed by the CRS, for example, by polling the bucket to determine the headers (including metadata) of each of the objects in the bucket. New objects are identified as having no previous metadata or object name, or changed objects have different metadata from the last time the metadata was scanned, and deleted objects are no longer represented by an object name or metadata. When a change is detected, for example, by scanning bucket headers or receiving a notification from the cloud provider, the rule is consulted and the CRS initiates whatever process is needed to satisfy the rule. An example is to copy (or replicate) an object from the current location in cloud 3 to a named bucket in cloud 2, for which the CRS has been provided with appropriate access permissions. Eventually, when the same process is performed on the bucket of cloud 2, the presence of the copied object will be determined. But the rule applied to the new object on cloud 2 may be different to that which obtained in cloud 3. For example, the rule for cloud 2 may be to do nothing until the age of the object in cloud 2 is one year.

So, there may be changes that are discrete events in time that are sensed fairly promptly, or at a later time, or metadata that is scanned at a later time and satisfies some criterion. Ordinarily, the event-type rules are intended to be executed as foreground operations and the criterion-type rules are intended to be executed in the background. An example of a background-type rule may be to move the object from on-line storage to cold storage. Where a cloud service provides push-type notification of eventual consistency, the CRS may act on such a notification independently of scanning the bucket headers.

Thus, the operation of the CRS involves maintaining a database of rules that are applied to objects based on their membership in a group of objects having a common attribute. The objects to which the rule is to be applied may be identified by reading the headers of the objects in a bucket during an update cycle, or on notification of an event if such notification is received by the CRS. The headers that are metadata are compared with the headers read during the previous update cycle and stored in the CRS database to determine changes. It may be convenient to hash the object metadata as this may obviate the need to compare the prior and present metadata sets in detail. Only changed hashed metadata need be further evaluated.

The CRS executes the rule on the objects subject to the rule. Ultimately, the stored data objects become consistent across the global storage environment when the CRS completes a scan of the headers in the destination bucket and a new object is identified that is consistent with the rule or the consistency is notified by an event.

The reading of headers and the execution of rules may be either tightly linked or loosely linked in time. It may be desirable to execute certain rules promptly, but other rules are less time critical and may be run at a slower pace.

Establishing the current status of the objects in a bucket may be routinely performed by requesting the headers of the objects in the bucket. Since there may be literally tens of thousands of objects in a bucket and the objects may change their status asynchronously with timing of the request, it may be useful to process the headers by executing a plurality of processing threads, each thread accessing a sub-range of the objects in the bucket. Since processing the metadata and determining status takes an amount of system resources, the number of threads operating may be scaled by the number of objects in the bucket and the desired update time. This may be derived from a user requirement or a system default.

The various elements of the storage environment may communicate using HTTPS protocol and requests may run over TLS, as an example. The CRS may interface with and object storage service (such as AWS) via the Internet or private IP channel or other high-speed communications path and may use a back-end API, compatible in each case with the object storage service or services on which each specific object or objects are maintained. Where communication between different entities is performed (and this may include different portions of the user address space, the Internet, or the like), the data may be encrypted in transit (e.g., by SSL or the like), and may also be encrypted at rest prior to transmission. SSL (Secure Sockets Layer) is a standard security technology for establishing an encrypted link between a web server ("the cloud") and a user. The SSL link ensures that all data passed between the web server and browsers remain private and integral. A virtual private network (VPN) providing encrypted communications with the replication server or other endpoint may be used. Other in-transit encryption techniques are known or are being developed and nothing herein is intended to limit the scope of the CRS to using a particular transport mechanism or encryption technique, or to use the same transport or encryption technique for a particular function.

As each of the different object storage services may be presumed to present different APIs to the CRS, a protocol adapter layer may be provided to translate user or CRS logical requests into storage-service-provider-specific API requests.

An endpoint may be a portal to a storage system provider that includes an Internet web address uniform resource locator (URL) as an entry point for the service provider. Objects are manipulated by specifying the bucket name and the object name in conjunction with the portal or end point address. While several formats for commands and status information do exist, at present there is a trend to base future developments in services so as to use RESTful commands, and herein this protocol is used for examples, without intending to limit commands to this protocol.

Where the service is compatible with AWS S3 protocol, the back-end application programming interface (API) set that is employed is compatible with the Amazon Web Services (AWS) product as may exist at the time for performing the functions described herein or a subset thereof. Other API sets may be used. The S3 protocol is one de facto standard at this time and may evolve or be superseded by other protocols. However defined, the method described herein may employ an appropriate application programming interface (API) sets that are recognized and supported by each of the web portals that are being employed as the data storage environment selected by a user.

Each cloud service vendor provides a set of API for their object storage functions that can differ in a myriad of ways from a similar set of API of other vendors. For cloud storage vendors that appear to adhere to Amazon's AWS S3 API, even such purportedly compatible API implementations can vary greatly with specific vendor restrictions and variations required for use. Moreover, Microsoft Azure uses a proprietary API quite dissimilar to other current vendor solutions.

CRS retrieves metadata from a source vendor's cloud object storage and converts the metadata to a format operable on the appropriate vendor object storage.

The API is executed through an endpoint, such as https://s3.amazonaws.com, as well as an permission access key and a secret key. Some cloud vendors may require additional temporary authentication tokens that need to accompany every API command. The system and method disclosed herein uses a per-replication configuration file (configfile) that describes the endpoints in the appropriate syntax. The example fragment shown below may be appropriate for an Amazon AWS to Microsoft Azure replication:

X-AWS-S3API-Endpoint: s3.amazonaws.com
X-AWS-Access-Key-Id: samplekey
X-AWS-Secret-Access-Key: sampleaccesskey
X-AWS-S3API-Endpoint2: core.windows.net
X-AWS-Access-Key-Id2: samplekey2
X-AWS-Secret-Access-Key2: sampleaccesskey2

Within the metadata associated with each object there may be a last modified date and a signature tag calculated from the object data. The signature tag is commonly referred to as an ETag. The method of determining the ETag is typically vendor specific and there is no standard approach. Indeed, in some instances the calculation method used for the value stored in ETag field is a proprietary method not publicly disclosed. One known method uses the MD5 hash value calculated from the object data.

Herein, the CRS preserves the original date and ETag information and supplements the vendor data with additional CRS-determined metadata, for compatibility. These metadata are later used in scan/compare cycles to ascertain if the source object has changed from the destination object and requires maintenance using the appropriate rule. by the CRS. In this way, the need to understand the process by which the vendor-specific ETag or metadata was generated is obviated, and an impediment to using multiple cloud storage providers to achieve the desired system performance, reliability and availability is overcome. Calculation of the object ETag locally by the destination cloud service provider for use by the specific vendor thus does not affect preservation of the original source ETag and data in the destination storage location.

The API command set may be overlaid with a graphical user interface (GUI) enabling the configuration of the storage environment and other services using visible data entry forms on an alphanumeric or graphical display and keyboard information entry methods or scripts. Such functions as establishing user access permissions, naming of buckets, data management policies and the like may be selected or configured. Of course, an API or other software tools, such as a command line interface (CLI) may be used directly.

In order to illustrate the differences in metadata data structure that currently exist between vendors, a non-limiting example using Microsoft Azure and IBM On-Premise cloud is described.

Metadata key names for Microsoft Azure permit only upper or lower case alphanumeric characters and the underscore '_', as well as being restricted to not start with a digit. Metadata from cloud environments that support other characters in key names are converted during replication to only use the allowed character set and configuration of characters. Unsupported characters are replaced with an underscore and, if the resultant key name already exists, additional underscores are added until the name is unique for that object. This at least guarantees that no metadata values are lost at the destination.

Examples

KeyName1: 'My Pictures@SFO'
KeyName2: '4My^Pictures@SFO'
KeyName3: 'My Pictures@@SFO'
ConvertedKeyName1: 'My_Pictures_SFO'
ConvertedKeyName2: '_4My_Pictures_SFO'
ConvertedKeyName3: 'My_Pictures__SFO'

In the case of IBM On Premise cloud, the allowed key name set is limited to alphanumeric characters and dash ('-'). To retain uniqueness on collisions, additional dash characters are appended.

Examples

KeyName1: 'My Pictures'
KeyName2: 'My@Pictures'
KeyName3: 'My$Pictures'
ConvertedKeyName1: 'My-Pictures'
ConvertedKeyName2: 'My-Pictures-'
//since//'My-Pictures' already exists
ConvertedKeyName3: 'My-Pictures—'
//since 'My-Pictures-' already exists The conversion process is thus not bi-directional and important metadata may be corrupted. The original metadata is maintained and managed.

In a non-limiting example a method of replicating from Microsoft Azure as a source location to a non-Microsoft S3 API cloud as a destination location may involve at least the following:

Microsoft Azure objects are accessed using their proprietary "blob" API and object metadata is retrieved from the source location. Metadata is converted and supplemented by the CRS depending on the constraints at the destination location. Using an appropriate API sent by the CRS, the object data is copied from the source location to a new destination blob. (As previously mentioned, vendors may variously call the unstructured data package an "object" or a "blob" a person of skill in the art would appreciate that this difference is largely cosmetic and the term "object" is generally used herein for simplicity unless blob is used in a specific example for clarity).

For larger objects, a multipart upload method may be used since the entire object being copied could be too large to read directly into memory before a multipart object may be created at the destination. Multiple parts are read then written, followed by a multipart completion API call at the destination. If the CRS configfile option "MD5" for destination is enabled, for example, then the data is copied while the MD5 hash is calculated for the metadata.

The eventual consistency of the object is verified by at least one of the methods described herein and the CRS data base is updated.

The created destination metadata then optionally includes the CRS-MD5 value and also includes the preserved source ETag and LastModified date. If the source object being copied is a snapshot of a source object then a special naming convention may be used for the destination object, as described in a another non-limiting example herein. Replicating object data from a non-Microsoft S3API cloud to Azure involves similar steps as above.

In FIG. 3, screenshots of the Fullsail_IMG_1006.JPG object and metadata is shown on a Microsoft Azure GUI and after replication as it appears in the destination bucket on Amazon AWS S3 in FIG. 4.

Each object in the global storage system may have a unique, fully-qualified identifier comprising the endpoint, the bucket name and the object key. The object key may comprise, by convention, a prefix and a name and may be the concatenation of the prefix and the object name.

<object_id>::=<endpoint>"/"<bucket_name>"/"<object_key>
<object_key>::=<object_prefix>"/"<object_name>

In common use, an example a prefix may be considered to be analogous to, but not identical to, a partial path in a file system. That is, the prefect key and the partial path may be used in some examples to perform similar functions. In file systems, paths are hierarchical and each element in the hierarchy is separated from its neighbor by a directory separator character ('/' on UNIX-like systems and '\' on Windows systems). Importantly, each element in the path corresponds to a distinct storage element (a node in the file system). This is not the case for object storage.

Objects are kept (at least logically) in named buckets. A bucket is a flat namespace, and does not intrinsically offer a hierarchical structure. What might appear to be pathnames (beyond the bucket name) are simply data strings: the bucket-relative object keys. Buckets may need to have a unique designation, at least within the domain of a single service provider, and this limitation is provider dependent. The diverse rules established by service providers suggest a best practice of having an unique identifier for each bucket of the global storage space maintained by the CRS.

Buckets do, however, permit object filtering by prefix. Conceptually, a prefix could be as simple as a single character, but in this context, users will often choose to assign objects keys that resemble pathnames, making the prefix equivalent to a bucket-relative dirname, and making the object name equivalent to a basename (in file-system parlance). There are a number of user application programs that can emulate a file system by systematic management and assignment of prefixes. However, below this level of abstraction, the objects are addressed as objects, without the resolution of the storage location to a file or a block.

Conceptually, a prefix can be any leading substring, but there may restrictions to their use in object storage services. For example, it is a fault to specify overlapping prefixes in replication rules in S3.

| | | |
|---|---|---|
| dim_x_bucket1/a/b/object1 | } | a/b/ |
| dim_x_bucket1/a/b/object2 | | |
| dim_x_bucket1/a/c/object3 | | a/c/ |
| dim_x_bucket1/b/object4 | | b/ |

The above fragment is an example of constructing prefixes that would avoid logical problems in AWS. Depending on the user application, a folder presentation scheme that purports to present the objects in a hierarchy of folders such as are common in graphical user interfaces (GUI) such as Windows or iOS may be presented as a skin to the user, however the actual manipulation of the objects is done by a schema in accordance with the associated metadata.

The CRS is a user-administered storage environment that makes use of the services of one or more cloud service providers as a repository for the user object data. However, unlike typical local data protection or replication schemes, the operation of the replication function of CRS is selective. Selectivity in this context means that some or all of the contents of a given collection of objects (a bucket or selected portion thereof, which may be a single object or thousands of objects) can be replicated to one or more other buckets. The set of buckets involved, including the source bucket and the destination bucket(s), may constitute a "replication group".

The each replication operation herein is between a source and a destination bucket, and need not be accessed through the same endpoint or even maintained by the same cloud provider, when more than one destination bucket is designated by the rule. One might choose to replicate an AWS bucket to Oracle cloud and also one from Google cloud to an Azure cloud, or the like. These operations can be done in parallel and using the same system (using, for example a VM (Virtual Machine) or a "bare metal" server).

Two files are used to start a replication using the and may use a CLI. A first file is the config header to provide at least endpoint information, credentials, and a few configuration options (such as delete after migration, unidirectional, or the like) [. The second file may contain a JSON (JavaOriented Script Notation) script embodying the rules defining the particular objects that are to be replicated, as well as the destination bucket. The rules file may be similar to the AWS S3 API Put Replication format with extensions of Regex and MetaRegex for more enhanced matching. Regexes are widely supported in programming languages, text processing programs, advanced text editors, and some other programs, including for, example, Java and Python.

An example rules file may be represented by the following fragment:

```
{
  "ReplicationConfiguration": {
    "Role": "iam:::role/s3-replication-role",
    "Rule": [
```

-continued

```
      { "Regex": "*.[jJ][pP][gG]", "Status": "Enabled", "Destination":
{ "Bucket": "testdst1" } },
      { "Regex": "*.[pP][nN][gG]", "Status": "Enabled",
"Destination": { "Bucket": "testdst1"} },
      { "Regex": "*.[gG][iI][fF]", "Status": "Enabled", "Destination":
{ "Bucket": "testdst1" } }
    ]
  }
}
```

Each rule can be one of a Prefix, Regex, or MetaRegex' To match everything in the source bucket: "Prefix ":" ".

The Regex and MetaRegex filters may match from the beginning of string and follow standard regular expression guidelines. In an example, to match from the end of the string, a prefix with '*.', as in "*.jpg" may be used. Note that matches are case sensitive. If one wanted to match all case combinations for jpg files then something like "*.[jJ][pP][gG]" may be suitable.

MetaRegex is a key-value pair with the key field being the object user metadata key. The following is an example to match objects that have a metadata key of MyTag and that have a value starting with Pictures: "MetaRegex": "MyTag: Pictures*".

A replication group may comprise a source bucket and one or more destination buckets. A replication group shown may be identified with the prefix "a/b/" and any object created in the SrcBkt1 with this prefix is configured to be duplicated into DstBkt1 through DstBktN in accordance with the appropriate schema (rule) stored in the CRS database. Initially this may be simple copy operation to establish the replicated object set, but the CRS maintains the replicated data as ongoing changes are made to the corresponding objects in the source bucket. As will be seen, the terms SrcBkt and DstBkt are functional terms and a bucket can be treated as a source bucket, a destination bucket or both simultaneously.

A replication group is specified not by selecting specific objects, but by specifying a pattern (prefix) for current and future objects, where the pattern applies to the object key (full bucket-relative ID). As such the replication group may have one object or multiple objects. A bucket is configured as having replication enabled by defining, for that bucket, one or more rules directing the replication. A typical rule includes definition of a target bucket and an object key pattern (a prefix). From a given bucket, multiple replication groups can be defined, each with its configuration rule. A bucket, in the context of a given rule (and therefore a replication group), is either a source bucket or a destination bucket. The source bucket owns the object, having the rule directing the replication defined for that bucket. The destination bucket is not a party to the definition, but may be aware of the definition based on the object metadata as will be discussed later. A given bucket therefore can be a source bucket in a replication group, for a replication set, but it can also be a destination bucket for a different replication set, and be part of a different replication group However, a person of skill in the art would appreciate that care should be taken to avoid circular paths.

A corresponding bucket may be defined on one or more service providers and owned by a same user. Bkt1, Bkt2 and Bkt3, for example, may each be in a different service provider. Objects may be replicated into a bucket, or originally stored in the bucket. Objects first received in the bucket may be processed in the bucket and replicated to another bucket in accordance with a schema (rule or rules)

established for each object or group of objects. Such schemas may include: replication of a stored object to another bucket, where the bucket may be located at a single provider, or multiple providers, as specifically configured; replication of an object to a plurality of buckets in accordance with a rule, a rule for each bucket or groups of buckets; chained replication, where the schema may replicate objects received from a first bucket to a third bucket, or the like. Objects replicated into a bucket are subject to the replication groups and rules of the destination bucket. So objects may be treated differently in a bucket depending on whether the object is the initial instance of the object, a replication thereof or some other versions thereof.

Chained replication differs from direct replication from a source bucket to multiple destination buckets. The result may eventually be the same, where the source object is replicated to two or more destination buckets. However, chained replication reduces the data bandwidth requirements on the source bucket as the object is replicated from the source bucket to the first destination bucket and then from the first destination bucket to the second destination bucket, or other disposition embodied in the schema. The rules or schema may also be known as a "filter" which may be applied to the metadata of the stored object or to the metadata in a data base managing the overall location of the stored data Once replication is defined for a bucket, and initial synchronization has completed, changes to objects in the source bucket are monitored and those changes are propagated to the replicas in accordance with the rules. A replication group's buckets are inspected (e.g., polled) on a regular basis to identify changes to the objects in the replication set. Changes to the objects can include adding, updating, and deleting objects, and changes to an object's attributes.

Figure 7:
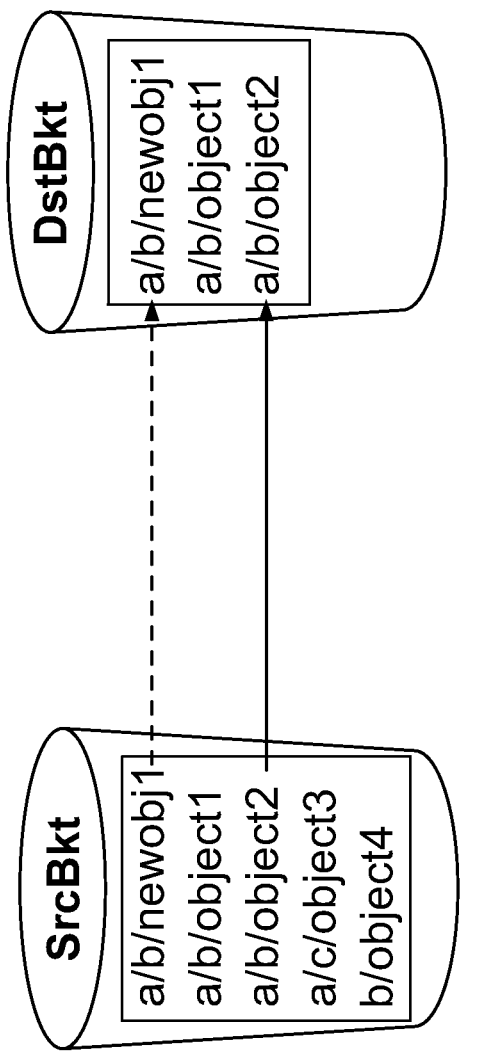
FIG. 7 is an example of replication of additions or updates from a source bucket to a destination bucket, where a/b/object 2 is an update to the SrcBkt and a/b/newobject1 is a newly stored object in the SrcBkt.
Figure 8:
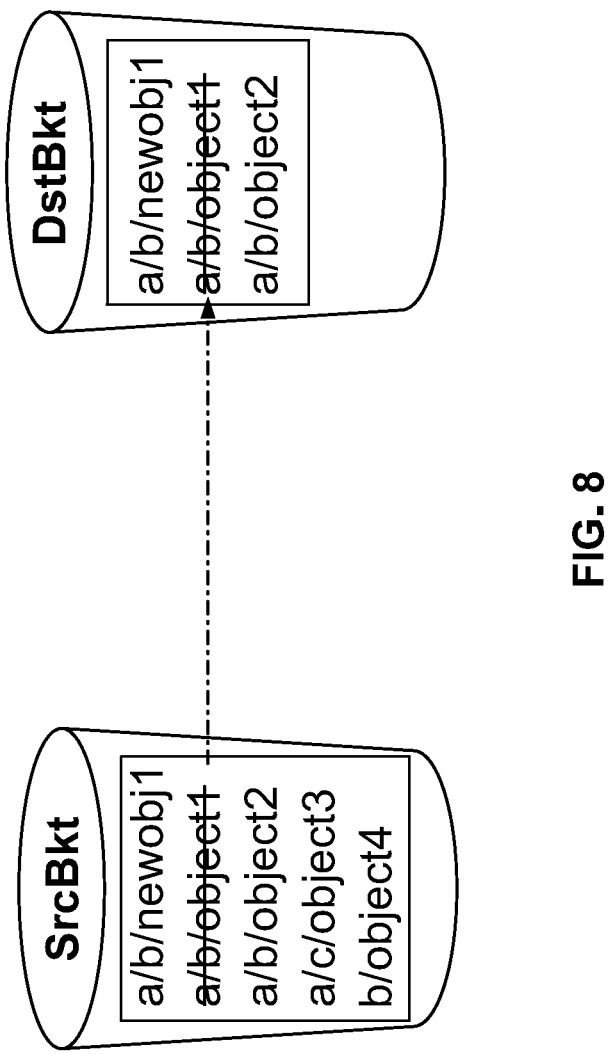
FIG. 8 is an example of propagating the replication of a deletion.

As shown in FIG. 7 and FIG. 8, only a source and a destination bucket are involved in the specific action. However where multiple replications have occurred, the action is performed wherever necessary to complete the process. So, when discussing "replication", this includes all actions to bring the overall storage of the data up to date, eventually.

Where monitoring of the status of an object through metadata is described, the process may be performed by reading the headers of the stored object in a bucket or by processing metadata maintained in the CRS data base. The metadata fields that may be associated with an object and are replicated may include, for example: File size, Last modification date/time, MIME type, Storage class, ACLs, MD5 checksum, Tags, and user defined-metadata.

Replication from a bucket that provides snapshots can be optionally configured to also replicate the snapshots along with the base objects. The destination object name for a source object that is itself a snapshot receives the base name followed by '-snap-' and the snapshot date-time. In a non-limiting example: at the destination (file100B-test is the base object):

file100B-test
file100B-test-snap-2019-01-04T14:33:12.0123007Z
file100B-test-snap-2019-02-05T15:17:44.0499007Z
file100B-test-snap-2019-03-06T16:08:32.0765007Z
file100B-test-snap-2019-04-07T17:22:52.0726007Z The CRS software compares the objects at the destination with the source snapshots from the base object name.

Ordinarily the CRS maintains the status of the overall storage environment by routine polling of the stored data headers. However, when a storage provider provides a push notification of status changes, the status change may be recognized and used to obviate the next routine status check for the object.

Event-based notification systems vary significantly across cloud storage platforms. For example, Azure requires one to register for certain events that get pushed to the using application. Other providers use a polling model. Each of the different cloud environments may be served through a compatible adapter at the CRS. While such compatibility support improves the speed the CRS can detect object changes at a cloud provider, the mechanism may not ensure that all changes will be captured. As described herein, the CRS scans objects at both source buckets and destination buckets to ensure eventual consistency. A combination of available event notification from each cloud provider and systemic scanning algorithms ensures that asynchronous replications occur in an expedient and reliable manner.

The Internet and the storage system providers are a heterogeneous and distributed environment that generally operates in an asynchronous fashion and has a reliability at any time that is considerably poorer than that of a local storage system. There are often transient outages in Internet service, for example. Replication is thus not strictly consistent, but is eventually consistent. Because there is a finite period of time between changes to the source bucket and the appearance of those changes in destination buckets, strict time consistency of action cannot be assumed.

The time needed to achieving eventual consistency for a particular object is dependent on the network connection, the amount of object data that is being moved and the specific ability to detect changes in the object source data. Typically, CRS may not lock access to the source object while replication is in progress. Therefore, when a user reads from an object at the source, there is no assurance guaranteed that the replication destination bucket has the same object data, since changes to the source object may not yet have been replicated, or the replication operation may not have been completed. The CRS could be configured by rule to lock the source object data until the object has been replicated to the target. However, this is typically not a common use case for public cloud architectures as there are inherent performance penalties.

Eventual consistency is achieved for the stored objects in each global replication group. Eventual consistency refers to the view of the state of the dataset across the components of a system (the source and destination buckets in this context). At a given instant of time, the replication set in the source bucket might have a different state than the replication set in the destination bucket(s). This is due to delays from polling intervals, and from communication and protocol delays during the replication process, and the underlying laws of physics. But, if the user access with by reading the source bucket, the resultant retrieved data is the current data. Of course, traditional methods for achieving strict consistency exist and may be extended to cloud environments; they may introduce further delays that may not be appealing in some contexts.

Once replication has been enabled for a replication group, a corresponding "reconciliation process" initiates. We have used "reconciliation" to describe the operation rather that "synchronization" as the dictionary definition of synchronous is "happening, existing, or arising at precisely the same time."

Replication is not about being consistent at the same time in different buckets, but about being in the same state: more formally, being in concordance. Replication (and, with it, reconciliation) occurs in cycles for each replication group.

The CRS tracks the state of the current cycle, and retains the statistics of the most recently completed cycle, and may retain aggregated statistics for all cycles in the replication epoch (which may be the time since the replication was defined and enabled).

Generally, once the replication config file for a replication group has been enabled (that is, a rule for a replication group), the concordance operation may execute periodically as a cyclic operation.

Cloud vendor APIs allow a consumer to list the objects stored in a bucket. The CRS may parallelize the list retrieval from both the source and destination buckets that may be resident on distinctly different clouds. The lists are retrieved and processed in a data stream of, for example, 1000 objects at a time. Dictionaries are built, indexed by the object name, to include the last modified timestamp. Objects are added to each dictionary if they match one of the filter rules of the replication config file.

The source and destination dictionaries are compared, to identify discrepancies. Objects in the source bucket that are not in the destination bucket need to be queued for replication. Objects in both dictionaries are checked for changes in size, modified date, or ETag. This is where the embedded CRS metadata values for ETag and modified date are used. Object storage copies set the last modified date to the time of copy without the means to preserve the original source date. Based on time comparison they would not match after a copy. Further, with cloud vendors uniquely calculating the object ETag, there may be no benefit to compare values achieved through different computational methods.

As an optional configuration item, the user can require that MD5 sum calculations of the full object data match before a decision is made on whether to replicate. Another configuration item may allow for items deleted on the source be also deleted on the destination, conversely, items on the destination that are not on the source can be optionally deleted as spurious.

There may also be a configuration option to only replicate objects older than a specified numbers of days, which is useful in managing archiving activities. Optionally, the source object may also be deleted in this scenario.

The system and method provides a configurable scan repetition time when determining the frequency of obtaining the list objects from the source and destination endpoints. By default, the scans may continuous and will algorithmically back off after a period of no source bucket changes detected, so as to manage the computational and communication load.

It may be more efficient to use events such as adds, deletes and updates to alter the concordance cycle. An immediate replication resulting from a trigger event such as adds, deletes or updates may have the effect of deferring the next regular concordance cycle to the next full cycle period. A specific example of an event may be the writing (a PUT, which is a REST-compatible command) of an object to the bucket. When the object storage service offers push notifications of changes to objects, it shifts a period-driven check to a full period after the push notification.

In an example, the processing of a bucket as part of the scan is described. The bucket (for example the bucket in cloud 3 shown in the FIG. 1) is polled by the CRS to initially determine the number of objects currently in the bucket. In accordance with the timeliness requirements for replication established by the user, the total number of objects is allocated to a number of processing threads. Each thread, which may have approximately the same number of objects to be managed, executes a cycle in approximately the same time. As each thread is performing the same functional operations, we will focus on the actions of one thread as representative of all of the threads operating on the bucket. The number of threads may be increased or decreased as the number of objects in the bucket changes or the user changes the timeliness requirement.

Once initiated, the replication criteria and composition of a replication group may be altered. For example, if the identifying pattern is, as a result, a subset of the former replication group (of objects) no longer qualifies (i.e. the key no longer matches the defined pattern or other parameters), then the object is removed from the replication group, but is not otherwise manipulated. Thus, the state of the object is no longer affected by the operation of the replication group and the object remains in the associated bucket until the object status is altered by some other process. Also, though the object is no longer in the replication group, any previously replicated instances in in the destination buckets of the associated replication group remain in place and are otherwise unaffected. Changes to the source bucket that involve these former members (e.g. updates and deletes) are no long propagated to the other buckets in the replication group.

A new destination bucket may be added to the replication group, and the CRS will initiate background updates to the newly added destination bucket or buckets, tracking the state of the background updates and propagating any new replication group changes to the new member, along with the other members of the replication group until eventual consistency is achieved. If a destination bucket is explicitly removed from the replication group, then the removed bucket is unaffected at the time it is removed and may still be accessed, but will no longer receive updates based on changes to the replication group. Background processes may address the objects in the removed bucket in accordance with a specified procedure.

Optionally, the user can request accelerated concordance, in which the replication facility attempts to attain concordance as quickly as possible. Even in this case, achieving concordance can take time, depending on the number and size of objects involved, and on network characteristics and state.

The source bucket in a replication group may be changed under some circumstances. For example, it is possible to change the source bucket in the case where there is at least one destination bucket that is fully coherent relative to the current source bucket.

When the source bucket change operation commences, the CRS may make snapshots of the states of the current source buckets and the designated replacement source bucket. Snapshots may include a listing of the matching contents of the bucket (the replication group members), along with the per-object metadata. The current source bucket ceases tracking changes or triggering replications. The objects subject to the replication policy are copied to the designated replacement source bucket (the new source bucket) and replication resumes, with any changes transpiring between the last snapshot and the start of replication being added to a change list.

A former source bucket may be designated as a destination bucket if so desired, and will receive replicas subsequently, in that case. If the former source bucket is removed from the replication group altogether, then it is unaffected by subsequent replication operations, but continues operations as a non-member bucket, unless removed from service altogether.

One problem with distributed computing using the Internet or similar services is that the reliability may be poorer than local data transmission and the communications outages may be of significant duration. These outages may affect local or regional transmission and need to be accommodated. During a replication operation, if the CRS is unable to access a destination bucket, the replication operation continues with the remaining destination buckets, and the CRS marks the missing bucket as unreachable for that session, and queues a retry. If the issue with the Internet is an outage in the path between the user and the source bucket, or the cloud containing the source bucket is unresponsive, then the user may request the data from the destination bucket in another cloud in accordance with the governing rule. The associated metadata may be evaluated to determine if the destination bucket data is consistent, or at least sufficiently current. In similar circumstances, the user may perform an update to the destination bucket, with a rule to replicate the stored data to the source bucket.

Each replication operation is treated as a complex transaction and each source-destination pair for an object is as an element of that complex transaction. For most objects, each element in the complex transaction can either succeed or fail. Typically, there is no partial success for most elements (perhaps the exception being explicitly decomposed objects, the replication of which is itself a complex transaction). A replication policy can include a threshold value of failures that, if reached, will cause the facility to cease retry attempts, or back off for a period before resuming retries, or provide a notification.

The CRS may maintain a transaction log, recording the intent and the relative success and failure of each transaction. If any elements within a complex transaction fail, the response depends on the nature of failure. An unreachable destination is marked as such, and queued for retry.

When methods have been described it should be understood that the ordering of the steps is illustrative and steps the method may be combined, omitted, reordered, repeated or the like without departing from the teachings of the disclosure. Similarly, in the claims, any use of letter or numerical identification of clauses is for clarity in description and does not imply a restriction on the sequence of performance of the steps in the method unless explicitly stated.

Although the present invention has been explained by way of the examples described above, it should be understood to the ordinary skilled person in the art that the claimed invention is not limited to the examples, but rather that various changes or modifications thereof are possible without departing from the spirit of the invention.

What is claimed is:

1. A system for managing objects in a heterogenous cloud environment, wherein objects are transferred from a user to the heterogeneous cloud environment and within the heterogeneous cloud environment over one or more object data paths, comprising:
    a server processor distinct from the heterogeneous cloud environment that receives a rule for managing a configuration of a replication group, the replication group comprising objects associated with the user and stored in a bucket in a first cloud or a second cloud of a plurality of clouds in the heterogenous cloud environment, the objects having been transferred over the one or more object data paths;
    a data base of rules maintained by the server processor;
    a data base of metadata maintained by the server processor for each object stored by the user in the first cloud or the second cloud of the plurality of clouds, wherein contents of an object stored by the user are immutable while the metadata associated with that stored object are configured to be read and modified independently of the stored object;
    wherein, responsive to receipt of a notification that an object has been stored in the replication group, the server processor applies the received rule to the object and includes the object metadata in the data base of metadata;
    wherein, response to a determination that the object metadata has changed and based on the rule for the object, the server processor maintains the configuration of the replication group in the plurality of clouds via a control path that is distinct from the one or more object data paths over which the objects are transferred; and
    wherein the server processor operates to manage the configuration of the replication group independent of any object data storage in the heterogeneous cloud environment.

* * * * *